United States Patent
Moore

[11] 3,816,160
[45] June 11, 1974

[54] METHOD OF MAKING A PLASTIC OPTICAL ELEMENT

[75] Inventor: Robert S. Moore, Pittsford, N.Y.
[73] Assignee: Eastman Kodak Company, Rochester, N.Y.
[22] Filed: Nov. 30, 1972
[21] Appl. No.: 311,018

Related U.S. Application Data
[62] Division of Ser. No. 134,995, April 19, 1971, Pat. No. 3,718,383.

[52] U.S. Cl..... 117/33.3, 350/96 WG, 350/175 GN
[51] Int. Cl..... B29d 11/03, B44d 5/06, C03c 11/28
[58] Field of Search..................... 117/33.3; 252/300; 350/96 WG, 175 GN

[56] References Cited
UNITED STATES PATENTS

| | | | |
|---|---|---|---|
| 3,101,472 | 8/1963 | Goribau | 350/175 GN |
| 3,169,163 | 2/1965 | Nassenstein | 350/175 GN |
| 3,370,902 | 2/1968 | Allinikou | 252/300 |
| 3,470,561 | 9/1969 | Horst | 350/175 GN |
| 3,485,556 | 12/1969 | Naujokas | 350/175 GN |
| 3,495,511 | 2/1970 | Javovik | 350/187 |
| 3,542,535 | 11/1970 | Hensler et al. | 350/175 GN |
| 3,614,197 | 10/1971 | Nishizawa | 350/96 WG |
| 3,700,440 | 10/1972 | McPeod et al. | 252/300 |

Primary Examiner—Ronald H. Smith
Assistant Examiner—J. P. Brammer
Attorney, Agent, or Firm—Ronald P. Hilst

[57] ABSTRACT

The invention relates to a transparent element for the deflection of incident electromagnetic radiation having an optical axis extending therethrough. The element includes a shaped polymeric matrix having an organic diluent therewithin, the diluent forming a continuous gradient in refractive index extending in a direction substantially perpendicular to the optical axis of the element. The element has lens-like properties.

8 Claims, 19 Drawing Figures

PATENTED JUN 1 1 1974

METHOD OF MAKING A PLASTIC OPTICAL ELEMENT

This is a division of application Ser. No. 134,995, filed Apr. 19, 1971 now U.S. Pat. No. 3,718,383.

This invention relates to plastic optical elements having a gradient of refractive index rendering these plastic elements suitable for use as a lens, a lens element, a light guiding element, and various other optical applications such as mirrors, etc.

Various plastic materials have been investigated and have been utilized in the past in the manufacture of certain types of optical elements. These plastic materials, essentially of uniform refractive index, are ground much like glass lens material to impart curvature to the optical faces thereof, thereby rendering these plastic materials suitable for use as lens media. For example, in U.S. Pat. No. 2,430,550 there is disclosed various copolymers of methylmethacrylate with styrene which may be used to form optical lens. Other publications in this field of technology include U.S. Pat. No. 3,194,116 relating to an optical lens formed from a copolymer of a acrylonitrile and styrene. As mentioned, in each of these publications, the curvature of the optical surfaces existing in the plastic element is imparted by various grinding techniques.

Another type of plastic optical element which is described in the literature is the element disclosed in U.S. Pat. No. 3,485,556 issued Dec. 23, 1969. This patent describes a plastic multi-focal ophthalmic lens which is apparently made by a conventional grinding or molding process but which includes an additional step in which monomeric liquids undergo mutual diffusion and subsequently are polymerized to form a non-homogeneous optical solid material in which there exists a transition zone of refractive index gradient from a higher-index first polymer to a lower-index second polymer, the transition zone comprising a copolymeric portion having variable composition. However, even in this type of plastic lens element, the plastic lens apparently depends primarily upon the curvature of the lens element to provide suitable lens-like action. Various inorganic glass optical lenses which utilize diffusion of inorganic components, such as the exchange of metal ions, on a curved glass surface to produce a uniform increase in refractive index at these glass surfaces are also well known and are discussed, for example, in U.S. Pat. No. 3,486,808, issued Dec. 30, 1969.

As is well known, the use of plastic materials, instead of glass, in the manufacture of various types of optical and other lens-like media has many potential advantages. Generally, the plastics are less expensive than the glass used to form the raw material of an optical or lens-like element. In addition, finishing operations such as polishing, etc., are usually more difficult and extensive with respect to glass optical elements (it being possible to produce plastic lenses by molding the final shape). Of course, it is also somewhat difficult to find plastic materials which possess the necessary physical and mechanical properties which render them suitable for forming conventional plastic optical elements therefrom. Much of this difficulty with various types of plastic materials is the result of the fact that the optical surface thereof must be properly curved in order to produce the desired optical surface. Of course, this is often a substantial problem in all types of lens manufacture including both glass and plastic materials. Accordingly, a plastic element which contains a gradient of refractive index and is suitable for use as a lens element or a lightguiding element without the necessity of utilizing a precisely curved surface would be a substantial advance in the art. In addition, it will be apparent that plastic elements capable of lens-like focusing action without any curvature of their optical surfaces can advantageously be combined with conventional lens making technology, e.g., grinding and molding, to form lenses having curved surfaces but which possess lens properties otherwise difficult to achieve or unattainable using conventional lens-making processes alone.

Therefore, a primary object of the present invention is to provide plastic lenses and lens elements containing a gradient of refractive index and which possess substantially flat optical surfaces.

Another object of the present invention is to provide a plastic element containing a gradient in refractive index which is suitable for use as a lightguiding element.

Still another object of the invention is to provide various plastic optical elements which possess lens-like properties.

A further object of the invention is to provide a novel method for making the aforementioned plastic optical elements.

These and other objects and advantages of the present invention are accomplished by diffusing an organic diluent into a transparent polymeric matrix having an optical axis. The diluent is distributed by diffusion into the matrix to form a continuous gradient in refractive index extending in a direction perpendicular to the optical axis thereof. In a featured embodiment of the invention the optical axis of the polymeric matrix extends between two optical surfaces which surfaces are substantially flat and aligned in a substantially parallel relationship with one another. The organic diluent is a low molecular weight organic fluid capable of diffusing into the polymeric matrix of the element and is further characterized in that the organic diluents useful in the present invention possess an index of refraction which differs from that of the polymeric matrix and are substantially incapable of inducing crystallization of the polymeric matrix. The polymeric matrix of the element of the present invention comprises a homogeneous, glassy, amorphous polymeric material.

In the present specification, the term "optical axis" is defined to mean an imaginary line which extends internally through the polymeric matrix of the elements of the invention and which passes through the centers of curvature of that portion of the end surfaces of the polymeric matrix adapted for the passage of incident light. In a featured embodiment of the invention wherein the end surface(s) of the polymeric matrix are substantially flat, these flat surfaces may be considered as portions of a sphere of infinite radius, and the optical axis will be an imaginary line extending through the matrix and substantially perpendicular to these flat surface(s). It should be recognized, as will be apparent from the illustrative embodiments of the invention appearing in the accompanying drawings, that an element of the present invention may have more than one optical axis. In such case these multiple axes will pass through the centers of curvature of the end surfaces of the polymeric matrix; however, in such case, each end surface of the matrix will in effect contain multiple centers of curvature; i.e., one center of curvature for each optical axis.

The term "optical surface" is defined in the present specification to mean a surface or surface portion of the transparent element of the present invention which is specifically provided as a window for the passage of electromagnetic radiation, such as light, which is to be deflected by said element.

The objects, advantages, and nature of the present invention, and its various features, will appear more fully upon consideration of the various illustrative embodiments now to be described in connection with the accompanying drawings.

FIG. 3-A shows a variation of FIG. 3. Distribution of the diluent in the matrix is not depicted in either FIG. 3 or FIG. 3-A.

Figure 1:
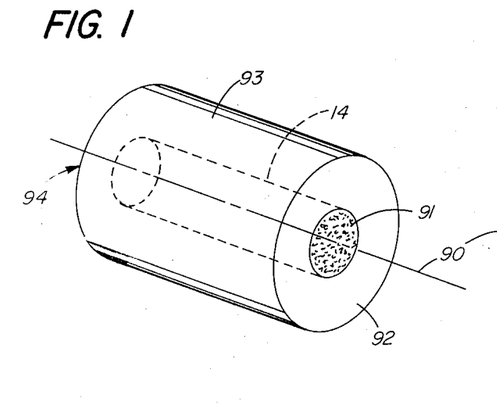
FIG. 1 shows a first illustrative embodiment of the polymeric matrix used in the invention, said matrix in the form of a hollow symmetrical cylinder. Distribution of the diluent into the matrix has not yet occurred.

Referring to FIG. 1 there is shown a first embodiment of the invention comprising a hollow polymeric matrix 93 in the form of a symmetrical cylinder. The optical surface 92 of the cylinder is large compared to a bundle of incident light rays, substantially flat and parallel to optical surface 94. An angularly symmetric, radial gradient of refractive index substantially proportional to radial distance perpendicular to optical axis 90 will be formed in the matrix by the diffusion of a diluent 91 into the matrix from the central core 14. That is, referring to FIG. 2 which illustrates a side view of the element of FIG. 1 after the diffusion of the diluent into the matrix has occurred, the refractive index varies radially in a nonlinear manner; at constant radius the refractive index is substantially independent of angular displacement, and the refractive index (at constant radius) is independent of distance parallel to the optical axis 90 of the cylinder. It will be noted in FIG. 2 that there is no central core indicated. This is because after diffusion of the diluent from the central core into the matrix occurs, the original boundary between core and matrix is no longer observable as will be further explained hereinafter.

Figure 2:
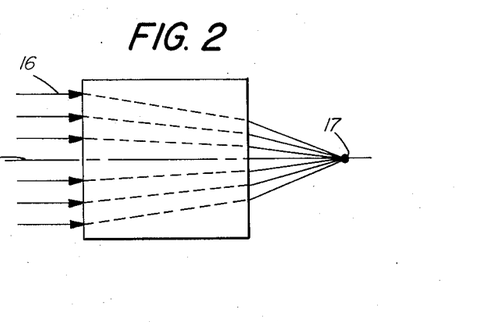
FIG. 2, included for purposes of explanation, shows a side view of a plastic optical element of the present invention prepared from the matrix of FIG. 1 showing the effect of the present invention upon incident electromagnetic radiation.

The formula governing the ray travel in the cylindrical element of the present invention illustrated in FIG. 2 (see N. Born and E. Wolf, *Principles of Optics*, first edition, MacMillan Co., New York, (1959), page 123) is:

$$1/R = -\underline{a}_r \cdot \underline{\nabla} \ln n$$

where R is the radius of curvature $\underline{a}_r$ is the unit outward normal, and $n$ is the refractive index. That the gradient in refractive index must be a function of radial displacement arises because of the focusing requirement. If the gradient were independent of radial distance, parallel rays 16 would all curve through the same angles without focusing to a point 17 (or in the divergent lens case without having originated from a virtual point). This would be analogous to the action of an isotropic wedge — useful for indicating effects of dispersion but not for illustrating focusing action. (Exempted from consideration in the latter category is the wedge of revolution, often called a conical axicon lens.) Consideration of the above equation indicates that useful focusing occurs for a refractive index, $n$, proportional to $r^2$, where $r$ is the radius. (Other conditions may require an exponent of $r$ other than 2). It will be seen therefore that the required refractive index gradient in a solid polymeric cylinder can be achieved by radial diffusion into the cylinder of a diluent having a refractive index different from that of the polymer. A detailed consideration of suitable polymer and diluent materials is presented hereinafter. Preferably the gradient is maintainable for times quite long compared to the time of use of the element, i.e., potentially perhaps for several decades; however, it may be maintainable for much shorter times on the order of from 1–2 days up to a period of months. Such a system has the obvious advantage of not requiring a significant amount of energy to maintain the gradient.

Figure 3A:
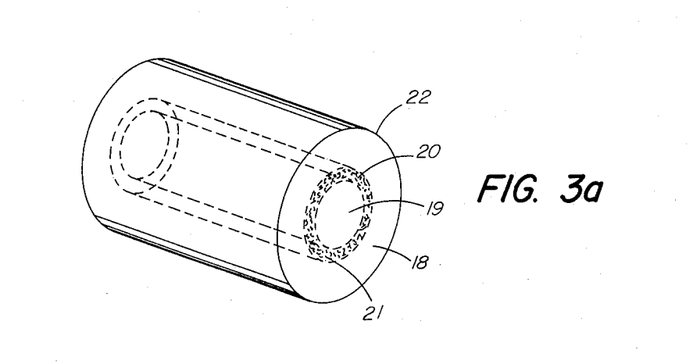
Figure 3B:
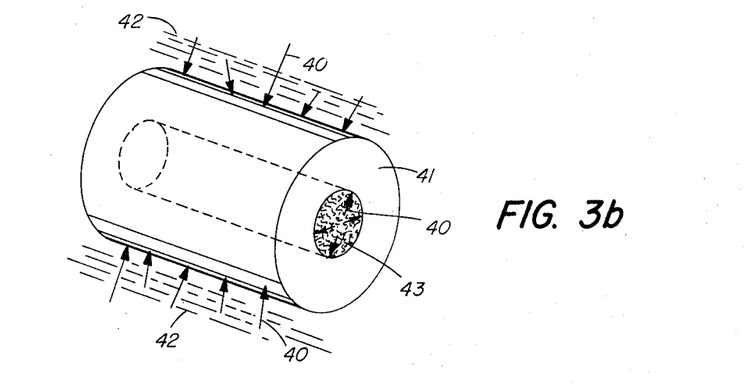
FIG. 3 shows a second illustrative embodiment of the polymeric matrix used in the invention, said matrix having the form of an annular element.

Referring now to FIG. 3 there is illustrated a second embodiment of the invention wherein the polymeric matrix is in the form of an annulus 22 concentric to rod 19. The diluent 20 is then diffused into the matrix from the hollow space 21 formed by the rod and annulus. After diffusion, incident light impinging on optical surface 18 is subjected to focusing action by the gradient in the matrix formed by the diffusion. FIG. 3-A is similar in construction to FIG. 3 except that the position of the diluent and matrix have been reversed. In FIG. 3-A the diluent is diffused from an external source 42 and an internal hollow core 43, as indicated by the arrows 40, into an annular polymeric matrix 41.

Figure 4:
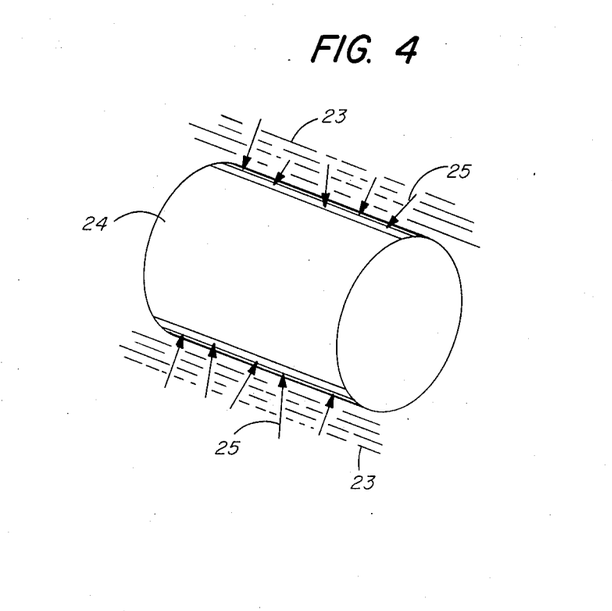
FIG. 4 shows a third illustrative embodiment of the invention wherein the diluent is diffused from an external source into a cylindrical polymeric matrix.

In principle, at least four ways of achieving the radical variation in refractive index in a cylindrical symmetric plastic element exists, i.e., two methods for positive and two methods for negative lens systems. For a positive lens system, the refractive index must decrease in the outward radial direction. Referring now to FIG. 4, this can be achieved by inward diffusion indicated by arrows 25 of an external diluent 23 having a refractive index lower than that of the matrix 24, or, alternatively, by the outward diffusion of a diluent of higher refractive index from a finite, but small central core within the polymeric matrix as illustrated above in FIG. 1. The same geometries for diffusion can also be applied to the divergent lens, i.e., the negative lens, with the relative magnitude of the refractive indices of the diluent and the polymeric matrix interchanged.

Figure 5:
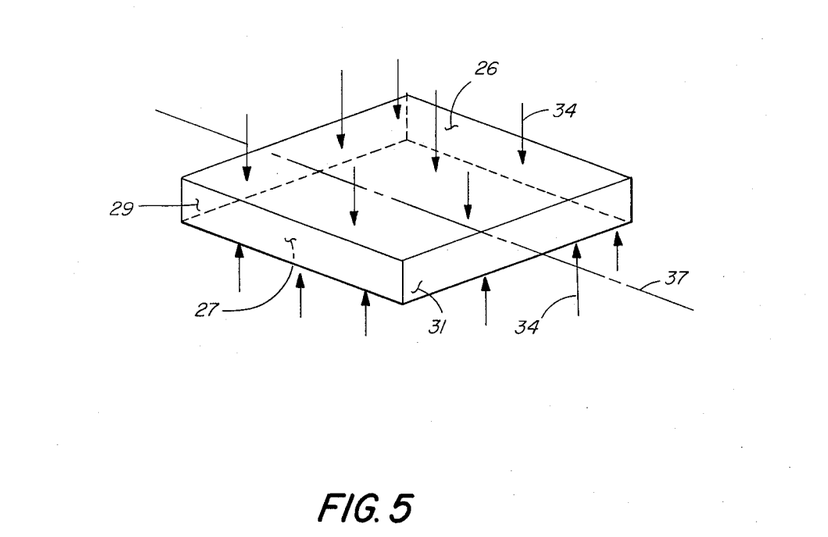
FIG. 5 shows a fourth illustrative embodiment of the invention having planar symmetry wherein the diluent is diffused into the matrix from an external source.
Figure 6:
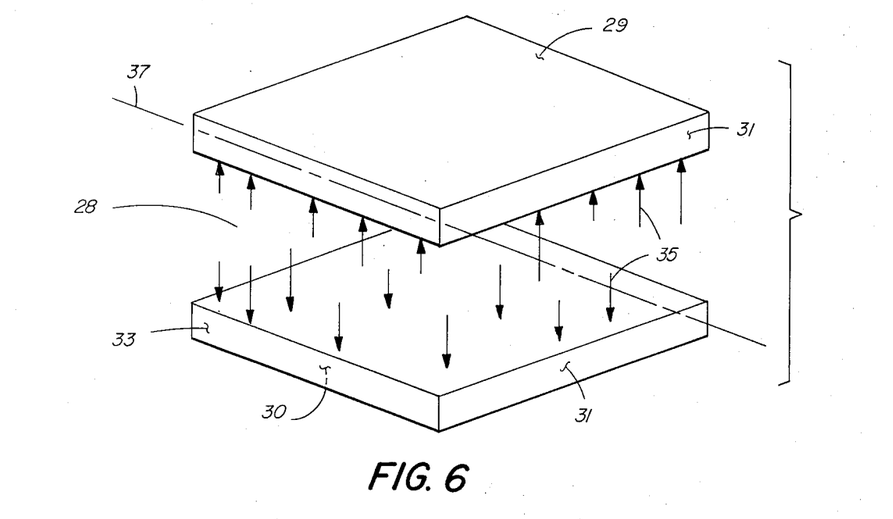
FIG. 6 shows a further illustrative embodiment of the invention having planar symmetry wherein the diluent is diffused into the matrix from a central cavity. Distribution of the diluent within the matrix is not depicted in FIG. 4, FIG. 5 or FIG. 6.

Up to this point, the cylindrically symmetric case has been the only one considered. From a technological as well as from a fabricational standpoint, the planar symmetric lens-like medium appears to be another useful medium. Referring now to FIG. 5 an example of the planar-symmetric case is that generated in a thick sheet of polymeric matrix 29 by diffusion of diluent (not shown in FIG. 5 or 6) either inward in the direction of arrows 34 through the surfaces 26 and 27 toward the center, or alternatively as illustrated in FIG. 6 outward in the direction of arrows 35 from a central cavity 28 toward the exterior surfaces 29–30 of sheets 32 and 33. Such an element would contain the proper refractive index gradient, but now, in only one "direction" with planar symmetry. Thus, there is obtained the analog of the action of that usual glass lens which is commonly called a "cylindrical lens". That is, incident light rays (not shown) to the optical surfaces 31 of the sheets would be focused, bent, or deflected into a plane rather than to a point. Advantageously, such a sheet may be shaped as a rectangular hexahedron. In the planar elements shown in FIGS. 5 and 6, the optical axis 37, in effect, can be viewed as an optical plane extending through optical surfaces 31.

Figure 7:
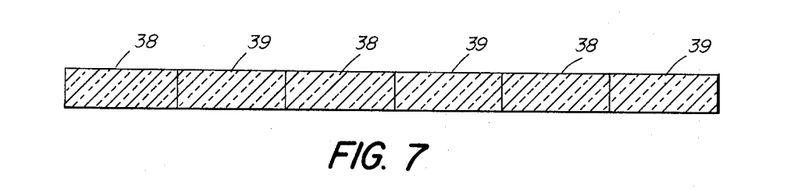
FIGS. 7 and 8 illustrate wave guide systems utilizing a continuous series of the plastic elements of the present invention.
Figure 8:
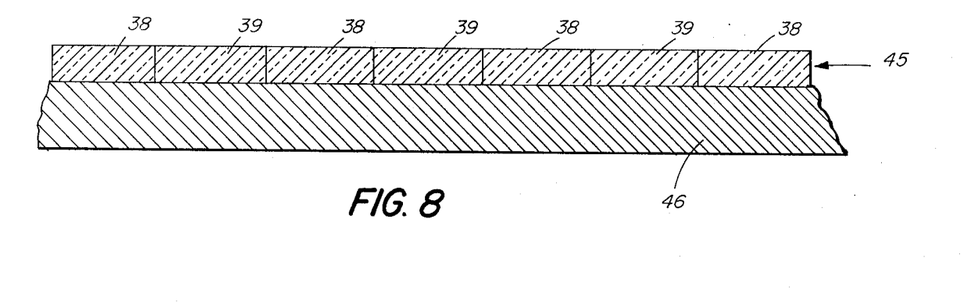

In addition to forming individual lenses as described hereinabove using the method and plastic elements of the present invention, another embodiment of the invention contemplates the use of a continuous series of such optical plastic elements to form a lightguiding or waveguiding system. Such systems are illustrated, for example, in FIGS. 7 and 8. Referring now to FIG. 7, there is illustrated a continuous series of negative and positive plastic planar symmetric lenses 38 and 39, respectively, of the present invention which, for example, may be utilized in solid-state devices as an input waveguide medium in cases in which only focusing in a plane is required. Such a waveguide system could be directly applied onto a substrate and provide a waveguide for a particular type of input signal. This is shown, for example, in FIG. 8 where a waveguide 45 has been applied to a substrate 46.

Figure 9A:
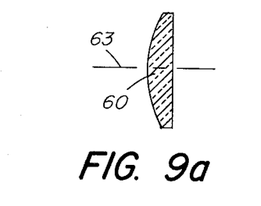
FIGS. 9a–c, 10a–c and 11a–b exhibit cross-sections of various types of curved surface lenses in accordance with the present invention.
Figure 9B:
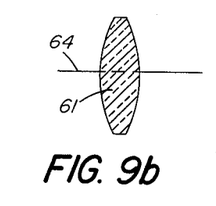
Figure 9C:
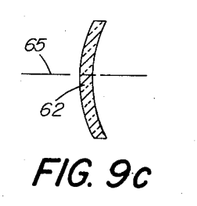
Figure 10A:
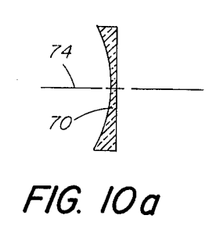
Figure 10B:
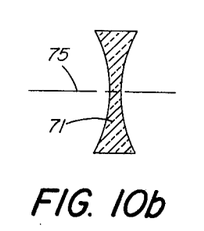
Figure 10C:
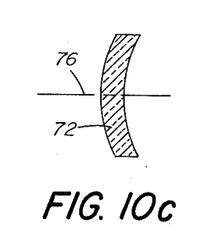
Figure 11A:
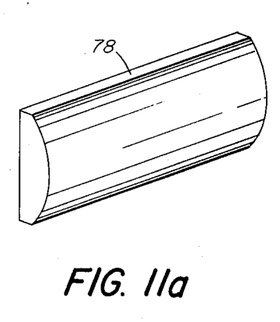
Figure 11B:
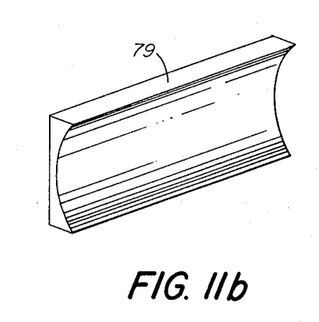

Referring now to FIGS. 9 to 11 there are illustrated various types of curved-surface lenses made in accordance with the present invention in combination with conventional plastic lens-making methods such as grinding and molding. FIG. 9a–c illustrates various types of convergent, i.e., positive effect, spherical lenses which could be made from the lens elements of the invention. A plano-convex lens 60 having optical axis 63, a bi-convex lens 61 having optical axis 64, and a convex meniscus lens 62 having optical axis 65 are illustrated in FIG. 9. FIG. 10a – c illustrates various types of divergent, i.e., negative lenses, which could be made from the lens elements of the invention. A plano-concave lens 70 having optical axis 74, a bi-concave lens 71 having optical axis 75, and a concave meniscus lens 73 having optical axis 76 are illustrated in FIG. 10. FIG. 11a –b illustrates various cylindrical lenses 78 and 79 which could also be made from the lens elements of the present invention. Of course, it will be understood that FIG. 9–11 are not intended to be exhaustive illustrations of the many varied types of lenses which could be derived from the lens elements of the invention in combination with conventional lens-making technology. It will be appreciated that many types of thin and thick lenses and lens systems can be made by conventional plastic lens-making techniques utilizing the unique lens elements and method of the present invention. A primary advantage of the present invention is that the plastic lens elements of the invention possess lens properties, i.e., a continuous gradient in refractive index, without any curvature of the optical surfaces thereof; thus, such a lens element, when combined with conventional plastic lens making techniques, enables one to obtain a resultant curved-surface lens having a refractive index gradient which is difficult to achieve or incapable of being achieved solely by conventional lens-making techniques.

Figure 12:
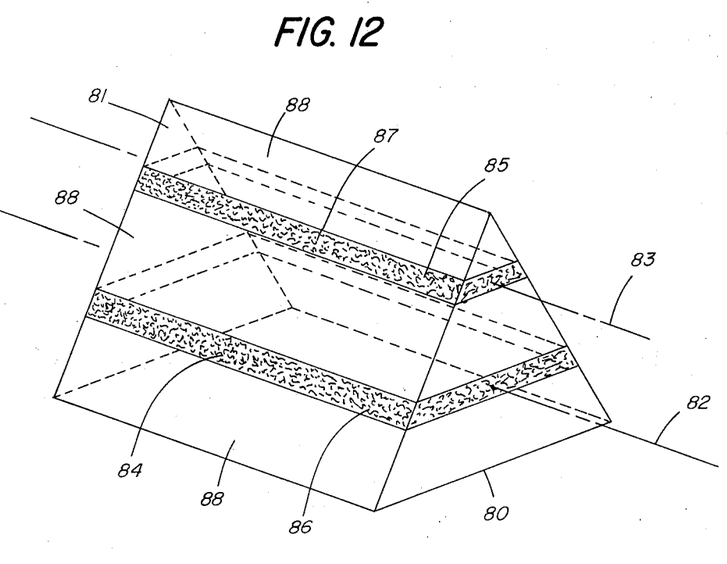
FIG. 12 exhibits an element of the present invention having multiple optical axes.

Referring now to FIG. 12 there is illustrated an element of the invention having triangular-shaped optical surfaces 80 and 81 and multiple optical axes 82 and 83 passing through the mid-point of cavities 84 and 85. The diluent 86 and 87 will diffuse into the matrix 88 to form two distinct gradients in refractive index within the matrix. The optical axes 82 and 83 in effect pass through two separate centers of curvature contained on surface 80 and two centers of curvature contained on surface 81 of the element. That is, first, since 80 and 81 are flat surfaces, they may be considered to be portions of spheres of infinite radii; next, since there are two optical axes 82 and 83 passing through each of surface 80 and surface 81, it may be considered that each of surface 80 and surface 81 consist of two separate smaller surfaces joined together to form a single larger surface wherein each of said smaller surfaces actually represent surface portions of two separate spheres of infinite radii. Accordingly, each optical axis, i.e. axis 82 and 83, may be considered to pass through a center of curvature contained on surface 80 or 81. The diluents may be the same or different materials. The matrix 88 of the element may be held in place by various types of support apparatus not shown. For example, transparent glass or plastic plates may be clamped against optical surfaces 80 and 81, or the entire element shown in FIG. 12 may be encased in a poly(tetrafuloroethylene) cell assembly having glass end plates as described in the accompanying examples.

Figure 13:
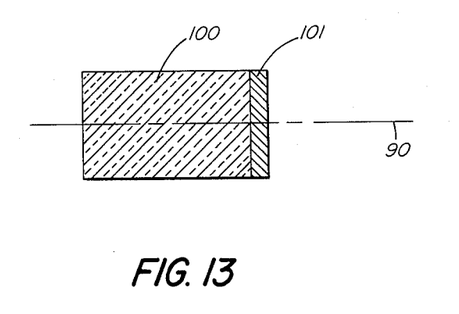
FIG. 13 exhibits an element of the present invention having a reflective backing layer thereby illustrating the mirror-like utility of the invention.

Referring now to FIG. 13 there is illustrated in cross-section a further capability of the plastic optical element of the invention, namely its use as a reflecting medium such as a mirror. In this Fig., a cylindrical element 100 such as that illustrated in FIG. 2 above is backed by a relfective backing layer 101. Accordingly, when an object is placed in the field of view of such an element, a reflected image thereof may be obtained. The optical appearance of the reflected image in comparison to the original object will depend on the type of lens-action possessed by element 100. Thus, the image may be larger, smaller, inverted, etc.

With respect to appropriate polymeric materials useful in the practice of the present invention, as noted hereinabove, these polymeric materials should be substantially amorphous and transparent. In addition, it is preferred that these materials exist in the glassy state at room temperature. By the term an amorphous polymer is simply meant the conventional definition of such a polymeric material, namely that the molecular structure thereof exists in an irregular pattern; in other words, the molecular structure thereof is substantially noncrystalline. Since polymeric materials having a substantially crystalline molecular structure can exhibit a high degree of light scattering, it should be apparent that this property would generally render such materials useless as light transmission media. Glassy state polymeric materials are generally characterized by a large Young's modulus on the order of about $10^{10}$ to about $10^{11}$ dynes/cm.$^2$. The properties of amorphous polymeric materials existing in the glassy state are well known in the art and can be further explored in numerous published materials which appear on the subject. For example, see Meares, P., *Polymers: Structure and Bulk Properties*, Van Nostrand Company Limited, London (1965), Chp. 9. Preferably, the useful glassy amorphous polymeric materials selected in the present invention also exhibit a relatively high glass transition temperature, $Tg$. The glass transition temperature of the polymeric material is the temperature at which the material undergoes a transition from the glassy state to the retarded highly elastic or leathery state. Materials having a glass transition temperature greater than about 27°C. may be used in the present invention, with preferred materials having a glass transition temperature greater than about 70°C. Although materials having a lower glass transition temperature may be used, such materials are generally not preferred as a plastic element prepared from such a material has a gradient of refractive index which is generally not stable at room temperature, and such an element may not possess sufficient rigidity to maintain its shape at room temperature. The polymeric materials useful in the practice of the present invention are further characterized by having a refractive index on the order of about 1.5, usually within the range of from about 1.42 to about 1.79. Moreover, the polymeric materials preferred in most embodiments of the present invention have a low dispersion index (V) which is defined as $$V = n_D - 1/n_F - n_C$$

where $n_D$ equals sodium D line, $n_F$ equals hydrogen F line, and $n_C$ equals hydrogen C line. Generally polymeric materials useful in the present invention have a dispersion index, V, within the range of from about 35 to about 50. However, in certain cases it may be useful to utilize a polymeric material having a substantially higher dispersion index within a range of from 50 to about 60. The polymeric materials utilized to form the matrix should also be transparent and preferably clear, i.e. colorless, although in certain applications a tinted transparent element may be desired. A partial listing of refractive indices and dispersion indices of some typical resins and polymeric materials may be found in Table I hereinbelow.

Table I

Refractive Indices of Resins and Polymers

| Refractive index | Reciprocal dispersive power | Material |
| --- | --- | --- |
| 1.356 | — | Poly(1,1-dihydroperfluorohexyl acrylate) |
| 1.367 | — | Poly(1,1-dihydroperfluorobutyl acrylate) |
| 1.39–1.43 | — | Poly(chlorotrifluoroethylene) |
| 1.394(20°C.) | | |
| 1.4177(20°) | 65.3 | Poly(trifluoroisopropyl methacrylate) |
| 1.436(20°) | 53 | Poly(triethoxy silicol methacrylate) |
| 1.452 | — | Poly(vinyl isobutyl ether) |
| 1.454 | — | Poly(vinyl ethyl ether) |
| 1.4563(30°) | — | Poly(ethylene glycol) |
| 1.46–1.50 | — | Cellulose acetate butyrate |
| 1.494(21°) | | |
| 1.46–1.50 | — | Cellulose acetate |
| 1.4634(25°) | — | Poly(butyl acrylate) |
| 1.4638(20°) | 51 | Poly(tert.-butyl methacrylate) |
| 1.467(20°) | — | Poly(vinyl methyl ether) |
| 1.4685(20°) | 58 | Poly(ethyl acrylate) |
| 1.47–1.49 | — | Poly(vinyl acetate) |
| 1.4667(24°) | | |
| 1.47–1.49 | — | Poly(vinyl butyral) |
| 1.47–1.48 | — | Cellulose propionate |
| 1.479(21°) | — | Ethylcellulose |
| 1.47 | — | Cellulose acetate propionate |
| 1.47–1.52 | — | Benzylcellulose |
| 1.4725(20°) | 59 | Poly(methyl acrylate) |
| 1.480(25°) | | |
| 1.4728(20°) | 57.9 | Poly(isopropyl methacrylate) |
| 1.4744(25°) | — | Poly(glycol succinate) |
| 1.4757(20°) | 55 | Poly(vinyl formate) |
| 1.477(25°) | 65.6 | Poly(isobutyl methacrylate) |
| 1.4768 | 57.8 | Poly(monofluoroethyl methacrylate) |
| 1.48–1.50 | — | Poly(vinyl acetal) |
| 1.4813(20°) | 57 | Poly(n-hexyl methacrylate) |
| 1.483–1.485(25°) | — | Poly(ethyl methacrylate) |
| 1.4831(25°) | 49 | Poly(n-butyl methacrylate) |
| 1.4831(20°) | 52.9 | Poly(ethylidene dimethacrylate) |
| 1.4833(20°) | 32.0 | Poly($\beta$-ethyoxyethyl methacrylate) |
| 1.4840(25°) | — | Poly(glycol maleate) |
| 1.484(25°) | — | Poly(n-propyl methacrylate) |
| 1.485(20°) | 54 | Poly(-3,3,5-trimethylcyclohexyl methacrylate) |
| 1.485–1.49 | — | Poly(methyl methacrylate) |

Table I — Continued

Refractive Indices of Resins and Polymers

| Refractive index | Reciprocal dispersive power | Material |
|---|---|---|
| 1.4893(23°) | 57.6 | |
| 1.490(20°) | 56.3 | |
| 1.4855(20°) | 50 | Poly(diacetin methacrylate) |
| 1.4868(20°) | 48 | Poly(-2-nitro-2-methylpropyl methacrylate) |
| 1.4889(20°) | 57 | Poly(triethylcarbinyl methacrylate) |
| 1.49 | — | Poly(propylene) |
| 1.49–1.53 | — | Poly(vinyl alcohol)molding compound |
| 1.4903(20°) | 55 | Poly(ethyl glycolate methacrylate) |
| 1.4917(20°) | 49 | Poly($\alpha$-methallyl methacrylate) |
| 1.494 | — | Poly(methyl methacrylate 80%, methacrylic formic anhydride 20%) |
| 1.4947(20°) | 55 | Poly(-3-methylcyclohexyl methacrylate) |
| 1.496 ± 0.003(21–23°) | — | Rosin ester |
| 1.4969(20°) | 58 | Poly(cyclohexyl$\alpha$-ethoxyacetate) |
| 1.4975(20°) | — | Poly(-4-methylcyclohexyl methacrylate) |
| 1.4990(20°) | 56.3 | Poly(decamethylene glycol dimethacrylate) |
| 1.50–1.514 | — | Cellulose nitrate |
| 1.501(21°) | | |
| 1.50–1.575 | — | Allyl cast resin |
| 1.5–1.7 | — | Phenol-formaldehyde resin |
| 1.500 ± 0.001(25°) | — | Poly(-sec.-butyl$\alpha$-chloroacrylate) |
| 1.5001(20°) | 58.8 | Poly(diallyl glycol carbonate) |
| 1.50131(20°) | | |
| 1.51002(20°) | | |
| 1.502 ± 0.001(25°) | — | Poly(ethyl $\alpha$-chloroacrylate) |
| 1.5028(20°) | 53 | Poly(2-methylcyclohexyl methacrylate) |
| 1.5048(23°) | 56.0 | Poly(hexamethylene glycol dimethacrylate) |
| 1.5066(20°) | 56 | |
| 1.505–1.51 | — | Poly(isobutylene) |
| 1.5059(20°) | 54.6 | Poly(bornyl methacrylate) |
| 1.5063(20°) | 53.4 | Poly(ethylene dimethacrylate) |
| 1.5066(20°) | 56.2 | Poly(cyclohexyl methacrylate) |
| 1.5099(23°) | 54.4 | |
| 1.5067(20°) | 54.3 | Poly(cyclohexanediol-1,4-dimethacrylate) |
| 1.508 | — | Butyl rubber, unvulcanized |
| 1.508 | 47 | Poly(-$\beta$-methallyl methacrylate) |
| 1.5110(20°) | | |
| 1.5096(20°) | 54 | Poly(tetrahydrofurfuryl methacrylate) |
| 1.51–1.55 | — | Poly(vinyl acetate) medium acetate type |
| 1.5111(20°) | 54 | Poly(1-methylcyclohexyl methacrylate) |
| 1.5117(20°) | — | Poly(pentaerythritol tetramethacrylate) |
| 1.5118(20°) | 53.9 | Poly(methyl $\alpha$-methylene butyrolactone) |
| 1.51–1.52 | | |
| 1.512(25°) | — | Poly(vinyl chloroacetate) |
| 1.5129(20°) | 46 | Poly(vinyl methacrylate) |
| 1.514(25°) | — | Poly(ethylene glycol fumarate) |
| 1.514(20°) | 50 | Poly(terpincyl methacrylate) |
| 1.517(20°) | 54 | Poly(ethylene chlorohydrin methacrylate) |
| 1.5172(20°) | 57 | Poly(methyl-$\alpha$-chloroacrylate) |
| 1.5155 | | |
| 1.52480 | | |
| 1.5174(20°) | 54 | Poly(diethylaminoethyl methacrylate) |
| 1.5179(20°) | 56 | Poly(2-chlorocyclohexyl methacrylate) |
| 1.519(25°) | — | Natural rubber |
| 1.5196(20°) | 49 | Poly(allyl methacrylate) |
| 1.52 | — | Poly(acrylonitrile) |
| 1.52 | — | Poly(methacrylonitrile) |
| 1.52 | — | Poly(butadiene) |
| 1.52 | — | Butadiene-acrylonitrile copolymers |
| 1.5200(20°) | 54.5 | Poly(methyl isopropenyl ketone) |
| 1.5219(20°) | — | Isoprene (polymer) |

Table I – Continued

Refractive Indices of Resins and Polymers

| Refractive index | Reciprocal dispersive power | Material |
| --- | --- | --- |
| 1.5228(20°) | 48.5 | Poly(methacrylic anhydride) |
| 1.523–1.57 | — | Polyester cast resin, rigid |
| 1.5246(20°) | 53 | Poly(-N-β-methoxyethyl methacrylamide) |
| 1.525–1.529(21°) | — | Poly(vinyl chloride-acetate) |
| 1.5250(20°) | 53 | Polycyclohexyl-cyclohexyl methacrylate |
| 1.525(20°) | — | Poly(2,3-dimethylbutadiene) |
| 1.527(25°) | — | Poly(acrylic acid) |
| 1.529 | — | Poly(acrolein) |
| 1.53 | — | Poly(vinylpyrrolidone) |
| 1.53 | — | Hydrochlorinated rubber |
| 1.53–1.55 | — | Nylon molding compound |
| 1.5303(20°) | 56.4 | Poly(vinyl cyclohexene dioxide) |
| 1.532 ± 0.001(25°) | — | Poly(cyclohexyl α-chloroacrylate) |
| 1.533 ± 0.001(25°) | — | Poly(β-chloroethyl chloroacrylate) |
| 1.536(25°) | — | Poly(vinyl chloride-acetate) (95/5) |
| 1.537(20°) | 52.5 | Poly(β-aminoethyl methacrylate) |
| 1.5381(20°) | 39.2 | Poly(furfuryl methacrylate) |
| 1.5390(20°) | 41.8 | Poly(butyl mercaptyl methacrylate) |
| 1.5396(20°) | 40 | Poly(α-phenyl-n-amyl methacrylate) |
| 1.5398(20°) | 47.5 | Poly(N-methyl methacrylamide) |
| 1.54 | — | Cellulose acetate(partly saponified) |
| 1.54–1.56 | — | Poly(vinyl chloride) |
| 1.565(40°) | | |
| 1.54–1.56 | — | Urea-formaldehyde molding compound |
| 1.541(25°) | — | Poly(glycerol rosin-maleate) |
| 1.5426(20°) | 40 | Poly(β-bromoethyl methacrylate) |
| 1.543 | — | Poly(vinyl-vinylidene chloride) (6/94) |
| 1.5431(20°) | 47.8 | Poly(methylene-α-valerolactone) |
| 1.544–1.546(25°) | — | Kauri copal |
| 1.545–1.555(25°) | — | Poly(vinyl acetate)(low acetate type) |
| 1.545 ± 0.003 (20°) | | Poly(abietic acid) |
| 1.546(25°) | — | |
| 1.547(20°) | 44 | Poly(ethyl sulfide methacrylate) |
| 1.547 ± 0.001(25°) | — | Poly(cyclohexyl bromoacrylate) |
| 1.5476(20°) | 47 | Poly(N-allylmethacrylamide) |
| 1.5487(20°) | 37.5 | Poly(α-phenlethyl methacrylate) |
| 1.55(20°) | — | Poly(vinylfuran) |
| 1.552(20°) | 32.5 | Poly(p-methoxybenzyl methacrylate) |
| 1.554(20°) | 35 | Poly(-p-isopropylstyrene) |
| 1.5540(20°) | 36 | μ-Poly(chloroprene) |
| 1.555(20°) | 36.8 | Poly(ethylene glycol benzoate methacrylate) |
| 1.5559(20°) | 37 | Poly(-p,p'-xylylenyl dimethacrylate) |
| 1.557(25°) | — | Rosin modified glycerolphthalate |
| 1.5573(20°) | 34.8 | Poly(α-phenylallyl methacrylate |
| 1.5575(20°) | — | Poly)-p-cyclohexylphenyl methacrylate) |
| 1.5592(20°) | 36.5 | Poly(-β-phenylethyl methacrylate) |
| 1.5624(20°) | 37.5 | Poly(-α-(o-chlorophenyl) ethyl methacrylate) |
| 1.5625(20°) | 36.2 | Poly(phenyl Cellosolve methacrylate) |
| 1.564(21°) | — | Maleic anhydride-styrene copolymer |
| 1.5645 (20°) | 40 | Poly(-1-phenylcyclohexyl methacrylate) |
| 1.5672(20°) | 46.5 | Poly(methyl α-bromoacrylate) |
| 1.5680(20°) | 36.5 | Poly(benzyl methacrylate) |
| 1.5682(20°) | 39 | Poly(β-phenylsulfone ethyl methacrylate) |
| 1.5683(20°) | 36.8 | Poly(-m-cresyl methacrylate) |
| 1.57 | — | Acrylonitrile-styrene copolymer |

Table I – Continued

Refractive Indices of Resins and Polymers

| Refractive index | Reciprocal dispersive power | Material |
|---|---|---|
| 1.57(20°) | 30 | Polydiallyl cinnamate |
| 1.570 ± 0.003(20–22°) | .013 | Poly(ethylene glycol phthalate) |
| 1.5705(20°) | 33.4 | Poly(o-methoxyphenyl methacrylate) |
| 1.5706 | 35 | Poly(phenyl methacrylate) |
| 1.5707(20°) | 34 | Poly(methacryl methyl salicylate) |
| 1.5707(20°) | — | Poly(o-cresyl methacrylate) |
| 1.571–1.572(20°) | — | Poly(diallyl phthalate) |
| 1.5714(20°) | 33 | Poly(eugenol methacrylate) |
| 1.5739(20°) | 44 | Poly(-2,3-dibromopropyl methacrylate |
| 1.575 ± 0.003(20°) | — | Poly(glycerol phthalate) |
| 1.5775(20°) | 30.7 | Poly(vinyl benzoate) |
| 1.5823(20°) | 37 | Poly(o-chlorobenzyl methacrylate) |
| 1.584 ± 0.003(20°) | — | Poly(pentaerythritol phthalate) |
| 1.5845(20°) | 27.4 | Poly(m-nitrobenzyl methacrylate) |
| 1.5857(20°) | 37 | Poly(N-β-phenylethylmethacrylamide) |
| 1.59–1.60 | 30.8 | Polystyrene |
| 1.5901(25°) | | |
| 1.5858 | | |
| 1.5932(20°) | 29.7 | Poly(-o-methoxystyrene) |
| 1.5951(20°) | 26.5 | Poly(cinnamyl methacrylate) |
| 1.5933(20°) | 31.0 | Poly(benzhydryl methacrylate |
| 1.5964(20°) | 33 | Poly(-p-bromophenyl methacrylate) |
| 1.5965(20°) | 34.5 | Poly(-N-benzylmethacrylamide) |
| 1.5967 (20°) | 28 | Poly(-p-methoxystyrene) |
| 1.60–1.63 | — | Poly(vinylidene chloride) |
| 1.60–1.70 | — | Polysulfide(Thiokol) |
| 1.6006(20°) | 36 | Poly(methacryl phenyl salicylate) |
| 1.6040(20°) | 30 | Poly(-o-chlorobenzhydryl methacrylate) |
| 1.6056 | — | Polycarbonate from 3,3',5,5'-tetrachlorodiphenyl |
| 1.608(20°) | 22.5 | Poly(pontachlorophenyl methacrylate) |
| 1.6098 | 21 | Poly(-o-chlorostyrene) |
| 1.612 ± 0.001(25°) | — | Poly(phenyl α-bromoacrylate) |
| 1.6150(20°) | 28.1 | Poly(-p-divinylbenzene) |
| 1.617–1.66 | — | Coumarone-indene resins |
| 1.6200(20°) | 24.1 | Poly(-N-vinylphthalimide) |
| 1.62–1.64 | — | Poly(dichlorostyrene) |
| 1.6248(20°) | 31.3 | Poly(-2,6-dichlorostyrene) |
| 1.6298(20°) | 24 | Poly(-β-naphthyl methacrylate) |
| 1.63 | 25 | Poly(-α-naphthylcarbinyl methacrylate) |
| 1.6319(23°) | 23.1 | Poly(fluorenyl methacrylate) |
| 1.6376(20°) | 29 | Poly(vinyl thiophene) |
| 1.64–1.70 | — | Poly(-α-naphthyl methacrylate) |
| 1.6411(20°) | 20.5 | |
| 1.645(20°) | 28 | Poly(lead dimethacrylate) |
| 1.645 ± 0.003(20°) | — | Cresylic acid-formaldehyde condensation resin |
| 1.650(25°) | — | Accroides |
| 1.6568(20°) | 27.5 | Poly(vinyl phenyl sulfide) |
| 1.66 | — | Butylphenol-formaldehyde resin |
| 1.6818(20°) | 20.9 | Poly(vinylnaphthalene) |
| 1.683(20°) | 18.8 | Poly(vinylcarbazole) |
| 1.70 | — | Phenol-formaldehyde resin |

Other polymeric materials useful for preparing the lens-like media of the present invention are the class of polymeric compounds comprising a thio-substituted bicyclic [2.2.1] moiety disclosed in U.S. Pat. Application Ser. No. 880,896, filed Nov. 28, 1969. now U.S. Pat. No. 3,660,521. Another useful class of polymeric material useful in the practice of the present invention are polymeric compounds comprising units of acrylic monomers comprising the group:

wherein R is hydrogen or alkyl, and preferably a hydrogen or methyl group, wherein said compound has appended thereto an alkyl thio-substituted polycyclic group or a polycyclic group containing at least two bridged rings, preferably fused together. When the appended group contains less than two bridged rings, substituted thio groups are necessary to provide materials generally having an index of refraction of at least 1.50 and dispersion values in the range of about 50 to 60. These polymeric materials are disclosed in U.S. Patent Application Ser. No. 880,894, filed Nov. 28, 1969.

The materials utilized as diluents in the practice of the present invention may be selected from a wide variety of organic materials. In view of the variety of materials which may comprise these diluent materials, it is helpful to characterize various materials useful as diluents by reference to certain advantageous properties which such materials should possess. The organic diluent materials may be characterized as transparent materials; furthermore, the diluent should possess an index of refraction different from that of the polymeric matrix material; and, in addition, the diluent should be incapable of inducing crystallization of the polymeric matrix material. The diluents, as noted hereinbefore, are capable of diffusing into the polymeric matrix material used in the invention. A complete understanding of the diluent-polymeric matrix interaction occurring during diffusion is not presently available. However, it may be noted that preferred diluents used in the present invention are solvents for the polymeric matrix material. As will be apparent from the properties which the diluents should advantageously possess, a particular diluent selected for use in the practice of the invention will vary depending on the particular glassy amorphous polymeric material used for the matrix of the element. For example, a material which is a solvent for one particular glassy amorphous polymeric matrix and which possesses an index of refraction different from that of this particular polymeric matrix material and which is incapable of inducing crystallization with this same particular polymeric matrix material may not be a satisfactory diluent material for a different glassy amorphous polymeric matrix material. Accordingly, the use of a particular diluent, as stated hereinabove, depends upon the selection of the glassy amorphous polymeric matrix material. In addition to the properties noted hereinabove, diluents are preferably low molecular weight materials in comparison to the molecular weight of the polymeric matrix materials. Generally, useful diluents have a molecular weight less than about 1,000 although materials having a higher molecular weight may also be used. Preferred diluents generally have a molecular weight range on the order of about 30–400. The reason for using relatively low molecular weight materials is to enhance the diffusion of the diluent into the polymeric matrix material. That is, to obtain an appropriate diffusion profile in a polymeric matrix within a reasonable time interval, a diffusing diluent molecule should be relatively small in comparison to the molecules of the polymeric matrix material into which it is diffusing. Table II contains a partial listing of various organic materials which may be utilized, depending upon the particular polymeric matrix material, as a diluent in the practice of the present invention.

TABLE II

| Diluent | Refractive Index | Boiling Point (° C.) |
|---|---|---|
| ethyl isocyanide | 1.3659 | 79 |
| isobutyraldehyde | 1.37302 | 61.5 |
| methyl ethyl ketone | 1.38071 | 79.6 |
| butyronitrile | 1.3816 | 118 |
| methyl methacrylate | 1.413 | 100 |
| isobutyl methacrylate | 1.418 | 155 |
| γ-chloronaphthalene | 1.63321 | 263 |
| γ-bromonaphthalene | 1.65876 | 281.1 |
| tripropylboron | 1.42354 | 156 |
| 1-nitropropane | 1.40027 | 132 |
| 2-nitropropane | 1.3941 | 120 |
| ethyl propionate | 1.38385 | 99.10 |
| n-butyl cyanide | 1.3909 | 141 |
| octane | 1.3975 | 125.8 |
| 1-ethylaminonaphthalene | 1.6477 | 305 |
| 1-isonaphthalene | 1.705 | 305 |
| dimethyl sulfate | 1.3874 | 188 |
| methanol | 1.33118 | 64.6 |
| ethylene formate | 1.358 | 174 |
| 2-fluoroethanol | 1.3647 | 103.3 |
| heptane | 1.3876 | 98.4 |
| 1-octanol | 1.429 | 195 |
| 2-octanol | 1.426 | 178.5 |
| 2-octanone | 1.416 | 173.5 |
| ethylene diacetate | 1.415 | 186 |
| di-n-butyl phthalate | 1.4925 | 340 |
| dimethyl phthalate | 1.5155 | 280 |

When the transparent element of the present invention is provided with a reflective backing layer to provide an element having mirror-like action as well as lens-like action, it will be appreciated that any of the known types of reflecting backing materials and compositions may be used. Thus, various reflective metallic backing layers such as silver, aluminum, etc. may be used. Nonmetallic reflective layers also may be used. The reflective backing may be applied directly to the transparent element or applied to a support which is immediately adjacent the element or a spaced distance therefrom. The reflective backing should be positioned adjacent the transparent element and the optical axis of the element should pass through the reflective backing.

With respect to the diffusion operation utilized in the process of the present invention to prepare the plastic elements of the present invention, it has been found useful to diffuse the diluent into the polymeric matrix material at temperatures generally higher than the glass transition temperature, $T_g$, of the polymer-diluent system. An additional factor affecting the diffusion temperatures utilized in the process of the present invention is the boiling point of the diluent. That is, in the process of the invention the diluent is advantageously diffused into the polymeric matrix from a liquid state.

For this reason, the diffusion temperature should be lower than the boiling point of the diluent to avoid vaporization thereof. Although the diluent, when in a vapor or gaseous state, is also capable of diffusing into the polymeric matrix, it presently appears advantageous to effect diffusion of a diluent which is primarily in the liquid state. It will be observed that the glass transition temperature, $T_g$, for the polymer-diluent system is different than the glass transition temperature of the polymer by itself. Moreover, the glass transition temperature of the polymer-diluent system will continually change as the concentration of diluent in the polymeric matrix increases. In the usual case, the glass transition temperature of the polymer-diluent system is lower than that of the polymer alone. Generally, in the diffusion process of the present invention it has been found useful to select a diffusion temperature which is from about 2°C. to about 25°C. below the glass transition temperature of the polymer alone. Using the preferred diffusion temperatures noted hereinabove, i.e., diffusion temperatures from about 2° to about 25°C. lower than the glass transition temperature of the pure polymeric material, diffusion coefficients on the order of about $10^{-6}$ cm$^2$/sec. have been commonly observed in the process of the present invention. With this type of diffusion coefficient, diffusion of the diluent into a polymeric matrix material to a depth of about 1 centimeter is generally easily achieved in times ranging from about several hours to about several days depending, of course, upon the particular diluent and particular polymeric matrix under consideration. Since the refractive index gradient existing in the plastic elements of the present invention is directly dependent on the concentration profile of the diluent in the polymeric matrix material, it is worth observing that by changing or programming the particular temperatures used during the diffusing process one can vary the resulting concentration profile of the diluent in the polymeric matrix material and thus influence the final refractive index gradient obtained. For additional information respecting the general, theoretical nature of diffusion processes, reference may be had to the following publications, *Diffusion In Polymers* edited by J. Crank and G.S. Park, Academic Press, London and New York, (1968); and H. Fujita, "Diffusion In Polymer-Diluent Systems", Fortschr. Hochpolym.-Forsch., Vol. 3, page 1, (1961).

Although the amount of diluent used in the process of the present invention to achieve a particular lenslike element will vary depending upon the difference in refractive index existing between the diluent and the polymeric material and depending upon the particular diffusion properties which exist with respect to a particular diluent-polymer system, a generally useful concentration of diluent lies within the range of from about 2 to about 40 weight percent of diluent based on the total weight of the resultant polymer-diluent system.

During the diffusion process used in the present invention to form a gradient of refractive index in the polymeric matrix, it should be noted that diffusion of the diluent into the polymeric matrix actually involves mutual diffusion. Since, however, the diluent diffuses into the polymeric matrix more readily than the polymeric matrix diffuses into the diluent (due primarily to the difference in size between the diluent molecule and polymeric matrix molecules) it is convenient to speak of the diluent diffusing into the polymeric matrix. Accordingly, it will be recognized that when the present specification and claims refer to the diffusion of the diluent into the polymeric matrix, it is understood to encompass the diffusion of the polymeric matrix into the diluent as well as the diffusion of the diluent into the matrix.

In carrying out the diffusion process used in the present invention to form a gradient of refractive index in the polymeric matrix, it will be apparent that various types of apparatus may be employed. The particular apparatus utilized is not deemed critical to the present invention. Convenient equipment which may be used, however, is briefly described hereinafter in the examples. It may be observed that when the plastic element of the present invention is formed within, for example, a cell assembly apparatus similar to that described in the accompanying examples wherein transparent end windows are clamped over the end surfaces of the polymeric matrix during the diffusion process, it may be unnecessary to remove the cell assembly upon completion of the diffusion process. That is, since the end surfaces of the polymeric matrix which are to receive incident electromagnetic radiatiion are covered by transparent windows, visible light can readily enter and exit the plastic element through these transparent windows of the cell assembly. In many cases it may in fact be desirable to retain the plastic element of the present invention firmly clamped in place within the cell assembly. For example, if a plastic element such as those illustrated in FIGS. 1, 3, 3A, 6 and 12 is prepared wherein the plastic element has a hollow inner core(s) or cavity)(s) from which the liquid diluent is diffused into the polymeric matrix of the element, it may be desirable to retain the resultant element in the cell assembly to prevent any residual diluent which has not completely diffused into the polymeric matrix from running out of the inner core(s) or cavity(s) of the element. In addition, the cell assembly or other similar apparatus may give additional support to the plastic elements of the invention. Of course, if, as often is the case, the diffusion process is sufficiently complete such that the diluent and polymeric matrix have undergone marked diffusion into one another, the resultant element may be freely removed from the cell assembly as there will be little or no remaining liquid diluent in the core(s) or cavity(s) which can run out. Following diffusion of the diluent and polymeric matrix, the original inner core(s) or cavity(s) will be observed to have been substantially reduced in size and in place thereof will be formed a solid composition comprising a mixture of the polymeric matrix and diluent. Depending upon the extent of the diffusion of the polymeric matrix into the diluent, the original cavity(s) or core(s) will be partially or wholly filled in with this solid mixture of polymeric matrix and diluent.

Various non-limiting embodiments of the present invention may be illustrated by the following examples.

EXAMPLE 1

A cylindrically symmetric element with positive lenslike action is illustrated. A rod of poly(methyl methacrylate), 2 inches long and ½ inch in diameter, having flat, polished ends is placed in a holder consisting of an outer concentric cylinder of poly(tetrafluoroethylene) of about the same length. The holder has a ⅛-inch wall thickness and an inner diameter of 1 inch. The ends of the holder are capped with ¼ inch thick plate glass windows of 1 ¼ inch diameter. The glass end windows are held clamped by annular 1/16 inch thick steel washers of 1 inch inside and 2 inch outside diameter. Screws parallel to the cylinder and rod axes join the washers to provide clamping. The diffusing liquid diluent is added through a side hole in the poly(tetrafluoroethylene) cylinder. The hole is then capped by a metal screw. The diluent liquid used in this example is ethylene diacetate The cell assembly is placed with the rod axis vertical in an oven at 95°C. for 40 hours after which the oven is turned off and is allowed to reach room temperature. The cell assembly is subsequently removed from the oven and is tested for lens-like action, several examples of which follow.

When placed in a parallel He-Ne laser beam of 1mm. diameter with the beam passing down the cell axis normal to the end plates, focusing of the light occurs. A focal length of about 2.6 inches is observed. A laser beam ¼ inch in diameter consisting of parallel rays of light is passed normal to the end plates and the beam is focused with about the same focal length. When the cell is placed on a page of printed text with the page rotated 180° (in its plane) from the erect position, a magnified image of the text is observed. As the cell is raised, the image breaks up into two circular groups of concentric closed loops. At about a 1-inch distance from the bottom of the cell to the page, an erect image of the text appears across the center of the cell.

EXAMPLE 2

A cylindrically symmetric element with positive lens-like action is illustrated. A ¾ inch diameter rod of poly(methyl methacrylate), 2-inches long, is placed in a cell similar to that described in Example 1. Ethylene diacetate is added and the cell assembly is heated at 95°C. for 12 days. The cell is observed to give lens-like action when placed in a collimated laser beam.

EXAMPLE 3

A ½ inch diameter rod of poly(methyl methacrylate), 2 inches long, is placed in a cell similar to that described in Example 1. A poly(methyl methacrylate) cylinder of 1 inch outside diameter, ¾ inch inside diameter, and 2 inches long is placed in the cell around the smaller diameter rod. The gap between the rod and the poly(methyl methacrylate) cylinder is filled with ethylene diacetate (via the cell end) and the cell assembly is placed in an oven at 95°C. for 11 days. After this time, the central rod can no longer be distinguished. When placed in a parallel beam of a He-Ne laser, lens-like focusing action is observed with a strong central spot of light which persists for some distance beyond the initial focal point. The far-field image is a ring of light, suggesting annular lens-like properties of the cell assembly.

EXAMPLE 4

A cylindrically symmetric element with positive lens-like action is illustrated. A rod of polystyrene, 2 inches long and ½ inch in diameter, having flat, polished ends is placed in a holder consisting of an outer concentric cylinder of poly(tetrafluoroethylene) of about the same length. The holder has a ⅛-inch wall thickness and an inner diameter of ¾ inch. The ends of the holder are capped with ¼ inch thick plate glass windows of 1 ¼ inch diameter. The glass end windows are held clamped by annular 1/16 inch thick steel washers of 1 inch inside and 2 inch outside diameter. Screws parallel to the cylinder and rod axes join the washers to provide clamping. The diffusing liquid diluent is added through a side hole in the poly(tetrafluoroethylene) cylinder. The hole is then capped by a metal screw. The diluent liquid used in this example is dimethyl phthalate:

The cell assembly is placed with the rod axis vertical in an oven at 94°C for 63 hours after which the oven is turned off and is allowed to reach room temperature. The cell assembly is subsequently removed from the oven and is tested for lens-like action, several examples of which follow.

When placed in a parallel He-Ne laser beam of 1 mm diameter with the beam passing down the cell axis normal to the end plates, focusing of the light occurs. Focusing to a point just inside or outside of the cell end is observed. When the cell is placed on a page of printed text with the page rotated 180° (in its plane) from the erect position, a magnified image of the text is observed. As the cell is raised, the image size decreases. An inverted image of distant objects could be observed when viewed through the center of the lens.

EXAMPLE 5

A cylindrically symmetric element with positive lens-like action is illustrated. A ½ inch diameter rod of polystyrene, ¼-inch long, is placed in a cell similar to that described in Example 1 except for a cell length of about ¼ inch. Di-n-butyl phthalate, is added and the cell assembly is heated at 95°C. for 47 hours. The cell is observed to give lens-like action when placed in a collimated laser beam.

EXAMPLE 6

A planar symmetric element with lens-like action is illustrated. A strip of poly(methyl methacrylate), 2 inches long and ½ wide and ¼ inch thick, having flat, polished ends is placed in a holder consisting of an outer cylinder of poly(tetrafluoroethylene) of about the same length with a square hole ½ inch × ½ inch. The ends of the holder are capped with ¼ inch thick plate glass windows of 1 ¼ inch diameter. The glass end windows are held clamped by annular 1/16 inch thick steel washers of 1 inch inside and 2 inch outside diameter. Screws parallel to the cylinder and rod axes join the washers to provide clamping. The diffusing liquid diluent is added through side holes in the poly(tetrafluoroethylene) cylinder. The holes are capped by metal screws. The diluent liquid used in this example is ethylene diacetate

The polymer strip is centered in the cell in this example. The cell assembly is placed with the rod axis vertical in an oven at 90°C. for 20 hours after which the oven is turned off and is allowed to reach room temperature. The cell assembly is subsequently removed from the oven and is tested for lens-like action. The cell was returned to the oven, heated at 90°C. for another 26 hours, again removed, cooled and tested for lens-like action. When placed in a parallel He-Ne laser beam of 1 mm diameter with the beam passing down the cell axis normal to the end plates, focusing of the light to a line occurs. The cell gave stronger lens action after 20 hours than after 46 hours suggesting that the shorter diffusion time led to a better lens material.

EXAMPLE 7

A cylindrically symmetric element with positive lens-like action is illustrated. A ½ inch diameter rod of poly(methyl methacrylate), ¼-inch long, is placed in a cell similar to that described in Example 5. Ethylene diacetate is added and the cell assembly is heated at 95°C. for 43 hours. The cell is observed to give lens-like action when placed in a collimated laser beam.

EXAMPLE 8

A cylindrically symmetric element with positive thick mirror-like action is illustrated. A rod of poly(methyl methacrylate), 2 inches long and ½ inch in diameter, having flat, polished ends is placed in a holder consisting of an outer concentric cylinder of poly(tetrafluoroethylene) of about the same length. The holder has a ⅛-inch wall thickness and an inner diameter of 1 inch. The ends of the holder are capped with ¼ inch thick plate glass of 1 ¼ inch diameter. The glass end plates are held clamped by annular 1/16 inch thick steel washers of 1 inch inside and 2 inch outside diameter. One plate has a coating of aluminum of about 80 percent reflectivity on the surface in contact with the polymer rod. Screws parallel to the cylinder and rod axes join the washers to provide clamping. The diffusing liquid diluent is added through a side hole in the poly(tetrafluorethylene) cylinder. The hole is then capped by a metal screw. The diluent liquid used in this example is ethylene diacetate The cell assembly is placed with the rod axis vertical in an oven at 95°C. for 47 hours after which the oven is turned off and is allowed to reach room temperature. The cell assembly is subsequently removed from the oven and is tested for mirror-like action. When looked into, one observes an inverted smaller image of part of one's face indicating a positive mirror-like action, the object being outside the focal length.

The invention has been described in considerable detail with particular reference to certain preferred embodiments thereof, but it will be understood that variations and modifications can be effected within the spirit and scope of the invention.

I claim:

1. A method of making a transparent element for the deflection of incident light which comprises diffusing a transparent diluent into a shaped transparent polymeric matrix of a homogeneous glassy amorphous polymer at a temperature less than the glass transition temperature of the polymer and greater than the glass transition temperature of the polymer-diluent system, said matrix having an optical axis extending between spaced optical surfaces thereof, said diffusion of the diluent into the polymeric matrix forming a continuous gradient in refractive index extending in a direction which is substantially perpendicular to the optical axis thereof, said diluent comprising an organic low molecular weight liquid which possesses an index of refraction different than that of said polymer and which is incapable of inducing crystallization of said polymer.

2. The method of claim 1 wherein said matrix is shaped as a cylinder and the diluent is diffused into the matrix from a hollow core centered about said optical axis.

3. The method of claim 1 wherein said matrix is shaped as a rectangular hexahedron and the diluent is diffused into the matrix from a cavity centered about said optical axis.

4. The method of claim 1 wherein said matrix is shaped as a cylinder and the diluent is diffused into the matrix from an external source.

5. The method of claim 1 wherein said matrix is shaped as a rectangular hexahedron and the diluent is diffused into the matrix from an external source.

6. The method of claim 1 wherein said diffusion occurs at a temperature within a range of from about 2° to about 25°C below the glass transition temperature of the polymer.

7. The method of claim 1 wherein said diluent is ethylene diacetate and said polymer is poly(methyl methacrylate).

8. The method of claim 1 wherein said diluent is selected from the group consisting of dimethyl phthalate and di-n-butyl phthalate and said polymer is poly(styrene).

* * * * *